United States Patent [19]

Cabou

[11] 4,390,959
[45] Jun. 28, 1983

[54] OPTIMAL START PROGRAMMER

[75] Inventor: Christian G. Cabou, Highland Park, Ill.

[73] Assignee: Johnson Controls, Inc., Milwaukee, Wis.

[21] Appl. No.: 198,667

[22] Filed: Oct. 20, 1980

[51] Int. Cl.³ .................... G06F 15/20; G05D 23/00
[52] U.S. Cl. .................................. 364/557; 364/418; 364/569; 236/46 R; 165/12
[58] Field of Search ............... 364/493, 557, 569, 418; 235/92 T; 236/46 R, 46 F, 47; 165/12

[56] References Cited

U.S. PATENT DOCUMENTS

| | | | |
|---|---|---|---|
| 3,912,913 | 10/1975 | Bounting | 236/46 R X |
| 4,001,557 | 1/1977 | Stephenson | 236/46 R X |
| 4,071,745 | 1/1978 | Hall | 364/120 X |
| 4,172,555 | 10/1979 | Levine | 236/46 R |
| 4,174,807 | 11/1979 | Smith et al. | 236/47 |
| 4,193,255 | 3/1980 | Ebihara et al. | 235/92 T X |
| 4,199,023 | 4/1980 | Phillips | 165/12 |
| 4,206,872 | 6/1980 | Levine | 165/12 X |
| 4,264,034 | 4/1981 | Hyltin et al. | 235/92 T X |
| 4,274,145 | 6/1981 | Hendricks et al. | 236/46 R X |
| 4,293,028 | 10/1981 | Knoll | 236/46 R X |

FOREIGN PATENT DOCUMENTS 131359 6/1975 Denmark.
1193711 6/1970 United Kingdom.

Primary Examiner—Edward J. Wise
Attorney, Agent, or Firm—Emrich, Lee, Brown & Hill

[57] ABSTRACT

An optimal start programmer for starting a heating or cooling cycle for an intermittently occupied building includes a digital counter which is enabled at the start of a pre-occupancy "search" period and accumulates counts from a timing source. A digital to analog converter is responsive to the cumulative output count of the counter circuit for generating a staircase or ramp signal which provides a time-variable set point signal during the search period. In the heating mode, the reference signal to the digital to analog converter is a signal representative of the outdoor ambient temperature; and in the cooling mode the reference is a constant signal. The operating mode of the system during the search period is determined by a mode selection circuit which is responsive to a heating mass signal and a cooling mass signal to automatically determine whether the system is to operate in a heating mode, a cooling mode or an inhibit mode in which neither the boilers nor the chillers are actuated.

18 Claims, 8 Drawing Figures

OPTIMAL START PROGRAMMER

BACKGROUND AND SUMMARY

The present invention relates to apparatus for programming the operation of heating, cooling and ventilating systems for buildings, particularly buildings which are intermittently occupied, such as office buildings, stores, shopping centers, and other commercial buildings. With the increased cost of energy, there have been great incentives to reduce the amount of energy used in heating and cooling buildings by way of scheduling lower temperatures in the buildings when they are not occupied, sometimes referred to as "night setback systems".

One of the problems encountered in programming building temperatures is that the building must be brought to the desired temperature by the time the occupants arrive at the building for work. If, for example, during the winter the night setback temperature is 55° F. and the building is scheduled for occupancy at 9:00 A.M., the system controller cannot wait until 9:00 A.M. before turning on the heating system because of the substantial time lag between the time the heaters may be turned on and the time the building will reach the desired temperature of occupancy. The same is true when the building is air conditioned and the outside air temperature exceeds the desired temperature of occupancy.

Many systems and techniques have been suggested for controlling system operation during the pre-occupancy period in which the interior of the building and its contents are brought to the desired temperature. One system for achieving the desired temperature at occupancy is referred to as an "optimal start programmer". One such system, referred to as the C-7501 Optimal Start Programmer is sold by Johnson Controls, Inc., of Milwaukee, Wis. This system uses an outdoor sensor for sensing outdoor air temperature, an indoor sensor for sensing indoor space temperature, and a motor-driven potentiometer to generate a simulated "set point" signal which increases from the night setback temperature to the desired occupancy temperature in a predetermined manner.

The length of the preheat period (that is, the period just prior to occupancy during which the simulated set point signal is generated) is determined by the outdoor temperature, as well as other variables, such as the heating mass of the building, the capacity of the heating plant, etc. In general, however, the preheat period is lengthened for colder outdoor air temperatures. When the set point signal becomes equal to or greater than the indoor space temperature, a "plant start" signal is generated to command the heating equipment to begin operation. Thus, the higher the indoor temperature during the preheat period and the higher the outdoor air temperature, the shorter will be the preheat period and the greater the savings in energy.

In these systems which generate a set point signal mechanically, the maximum preheat period is determined by the ratio of a gear box. In order to change the maximum time for the preheat period, a major modification of the programmer is required. Earlier systems which used cam-driven potentiometers to generate the set point signal used the profile of the cam to determine the maximum preheat period.

Because of the long periods required for preheating of buildings (eight hours or longer for a maximum preheat time is not unusual), conventional analog electronic circuit techniques are not used to generate the set point signal because of the prohibitive size of components and lack of accuracy. Further, prior art systems were not able to accommodate both warm up and cool down of the indoor temperature during the pre-occupancy period during which the energy source is actuated, without manually changing a mode switch on the programmer.

The present invention is thus directed to an optimal start programmer in which a set point signal is generated electronically, and preferably using an oscillator circuit which may be synchronized with a line frequency signal and having its output coupled to a counter circuit. A standard timer and controller, which preferably is a controller oriented processor or COP, as it is referred to in the art, also receives the output of the oscillator as a clock signal. The timer generates time and calendar data for determining occupancy periods, non-work days, and the pre-occupancy period during which the temperature of the space is brought from the night setback temperature to the desired temperature at occupancy. The present system is adapted to accommodate both heating and air conditioning, and includes an automatic changeover circuit, (called a mode selection circuit) for determining the operating mode as a function of the mass temperature. For this reason, the preoccupancy period is referred to as a "search" period to indicate that it is generic to both the heating and cooling modes.

The digital counter is enabled at the start of the search period by the timer and controller circuit, and it accumulates counts from the oscillator or timing source.

The output signals of the counter are fed in parallel to a digital to analog converter which generates a staircase or digital ramp signal which is used as a time-variable set point signal during the search period.

The mode control circuit actually defines three modes of operation during the search period. This circuit is responsive to a heating mass signal and a cooling mass signal. Each of these signals, theoretically, is representative of the temperature of the indoor space being controlled, although they may have different readings because of their different locations. They are referred to as temperature "mass" signals because in a dynamic situation, they represent not only the temperature of the space, but the temperature of the mass associated with the space which has an effect on the time required to bring the space to a desired occupancy temperature. Although a single mass temperature signal may be used, in some applications it is preferable to use both a heating mass signal and a cooling mass signal because of the desirability of locating the two sensors in different places.

If the heating mass signal indicates a temperature less than a first predetermined temperature (for example, 65° F.), the mode control circuit defines a heating mode of operation during the search period. If the cooling mass signal indicates that the temperature of the space is greater than a second predetermined temperature higher than the first predetermined temperature (for example, 75° F.), then the mode control circuit defines a cooling mode of operation. The temperature band between the first and second predetermined temperatures defines a range in which the mode control circuit generates an inhibit signal so that neither the heating source nor the cooling source are energized.

When the system is operating in the heating mode, the reference signal to the digital to analog converter which generates the time-variable set point signal is a signal representative of the outdoor air temperature, derived from an exterior sensor. In this manner, the starting point of the time variable set point signal in the heating mode is defined by the outdoor temperature. If the mode control circuit specifies operation in the cooling mode, a fixed voltage signal is used as the reference for digital to analog converter. The output signal of the digital to analog converter is a current, which is then converted to a voltage and subtracted from the reference signal to generate the actual set point signal. The set point signal is then compared with the mass temperature signal and, depending upon the mode of operation, the resulting signal is used to energize the "boilers relay" or the "chillers relay" to energize the heating or cooling source respectively, as conditions require.

Thus, the present invention employs digital circuitry to generate the time variable set point signal and therefore takes advantage of the greater reliability and repeatability of electronic circuitry, particularly in relation to the cam-driven and motor-driven potentiometers of prior systems. By using solid state circuitry exclusively, no moving parts are incorporated in the optimal start programmer whatever. Further, the provision of a mode control circuit prevents inadvertent operation in the wrong mode, for example, as might be caused by failure to set prior systems manually into the desired mode, and it further permits the system to respond to wide changes in outdoor temperature as they are reflected in the mass temperature signal without having to effect a corresponding manual change on the programmer.

Other features and advantages of the present invention will be apparent to persons skilled in the art from the following detailed description of a preferred embodiment accompanied by the attached drawing wherein identical reference numerals will refer to like parts in the various views.

THE DRAWING

DETAILED DESCRIPTION

Figure 1:
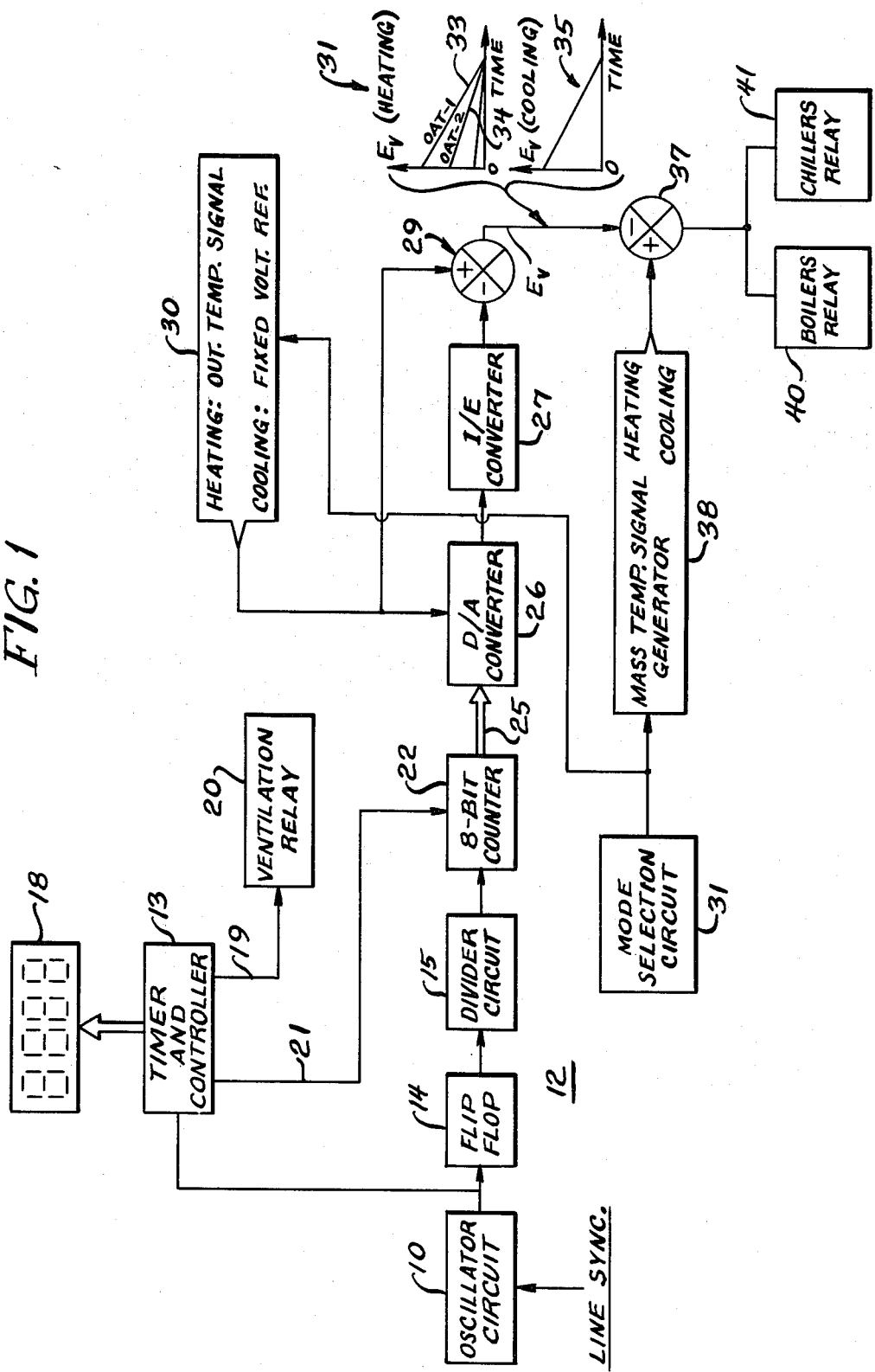
FIG. 1 is a functional block diagram of a system incorporating the present invention.

Referring first to FIG. 1, reference numeral 10 designates an oscillator circuit for generating a clock signal at a rate of 60 hertz. The oscillator may be a conventional 555 timer circuit wherein the period is determined by the values of an external resistor and capacitor, as is known in the art. The oscillator circuit 10 is synchronized with a conventional 60 hertz line signal each cycle for as long as power is available. Battery power may be used as a back up in the event of a power outage.

The output signal of the oscillator 10 is fed to countdown circuitry generally designated 12 and to a Timer and Controller circuit 13. The countdown circuitry includes a flip flop 14, the output of which feeds the input of a divider circuit 15. The divider circuit 15 counts down the repetition rate of the input signal by 2560. Hence, by cascading the flip flop circuit and the divider circuit as shown, the repetition rate of the oscillator circuit 10 is divided by 5120, whereas by shorting out the flip flop, the repetition rate of the oscillator circuit 10 is divided by 2560, as will be explained more fully below.

The Timer and Controller circuit 13 may be a conventional integrated circuit such as the MM57160 Standard Timer and Controller produced and sold by National Semiconductor Corp., of Santa Clara, Calif. It is a chip which contains a controller oriented processor (COP) and is designed for use in repetitive timing applications. It has a 24 hour real time clock and is capable of generating up to four output control signals at four different set points or programmed times of the day. It is also capable of skipping certain days so that different weekend conditions may be implemented. A four-digit digital display 18 is associated with the Timer and Controller 13 for displaying time-of-day information. The time-of-day data is generated from the periodic signal received from the oscillator circuit 10.

The Timer and Controller 13 is programmed to generate a first output signal on a line 19 to energize a ventilation relay 220 during the search period, preferably 10–15 minutes before occupancy, although this may vary depending on the application. A second output signal is generated on a line 21 to enable a counter circuit 22, also at the beginning of a search period. The programmed time for beginning a search period will depend upon whether the flip flop circuit 14 is employed or not. Assuming that the flip flop circuit 14 is in circuit with the divider 15, the approximate time of the search period is 6.06 hours. That is, the flip flop 14 divides the repetition rate of the oscillator 10 by two, and the divider 15 divides it again by 2560, thereby generating an output signal to the counter circuit 22 every 85.3 seconds. Since the counter 22 is an eight bit counter, in this example, it is capable of accumulating 256 counts, each count representing 85.3 seconds, thereby comprising a period of 364 minutes or 6.06 hours. If the flip flop 14 is not employed, the search period is approximately three hours and two minutes.

The eight outputs of the counter 22 are fed in parallel by means of a bus 25 to the inputs of a digital to analog converter circuit 26. In the illustrated embodiment, the counter 22 is a "countup" circuit but the invention is not so limited. That is, with suitable modification the system will work equally well with a "countdown" circuit.

The output signal of the digital to analog converter 26 is a staircase or digital ramp which increases by a fixed increment each time the contents of the counter 22 is incremented. This signal is converted to a voltage signal by the I/E converter circuit 27, the output of which feeds the minus input of a summing junction generally designated 29. The reference voltage for the digital to analog converter 26 as well as the signal to the positive input of the summing junction 29 is received from a reference signal generator 30 which, in turn, is controlled by a Mode Selection Circuit 31. If the Mode Selection Circuit 31 determines that the system is operating in the heating mode, as will be explained further below, then the output signal of the block 30 is representative of the outdoor air temperature (OAT). On the other hand, if the system is operating in the cooling mode, as determined by the Mode Selection Circuit 31, the reference signal generated by the block 30 is a fixed voltage reference signal.

Turning now to the summing junction 29, it has a fixed reference signal at its plus input, although obviously in the heating mode, over an eight hour period, when the outdoor temperature signal is used as a reference, it may vary. At the negative input of the summing junction is the digital ramp signal generated by the digital to analog converter 26. The output signal of the summing junction 29 is thus a signal which begins at a positive level and is then decremented as the output signal of the digital to analog converter 26 increases. The positive level at which the output signal starts depends upon the outdoor air signal when operating in the heating mode, as diagrammatically illustrated in the inset graph designated 31. As the outdoor air temperature increases, the output signal of the generator 30 (namely, the bridge circuit in which the sensor is connected) decreases. Thus, the characteristic curve defining the output signal of the summing junction 29 will, for example, change from the line designated 33 to that designated 34 for an increase in outdoor air temperature. When the system is operating in a cooling mode, the voltage reference is constant, and the characteristic curve relating the output signal of the summing junction 29 to time is defined by the graph generally designated 35. Thus, the output signal of the summing junction 29 is a time variable set point signal, designated $E_V$. That signal is coupled to the negative terminal of a comparator circuit 37 having its positive input connected to the output of a mass temperature sensor designated by the block 38. In the illustrated embodiment, two separate mass temperature sensors are used, one for heating and one for cooling. This permits placement of the sensors in preferred locations. For example, the mass sensor for heating should be located on an interior surface in an exterior zone of the space being heated. A wall perpendicular to an exterior wall or a concrete pier would be suitable places for its location. The cooling sensor might be located in the southwest or west sides of a building because they are the most likely places to be influenced by solar energy.

When the mode selection circuit 31 dictates operation in the heating mode, the heating mass temperature signal is coupled from the block 38 to the comparator 37; and when the time variable set point signal falls below the heating mass temperature signal the comparator 37 generates an output or command signal to energize a relay 40 to actuate the boilers. Similarly, when the system is operating in a cooling mode and the set point signal falls below the cooling mass temperature signal, the comparator 37 generates a command signal to energize a relay 41 to actuate the chillers.

Figure 2:
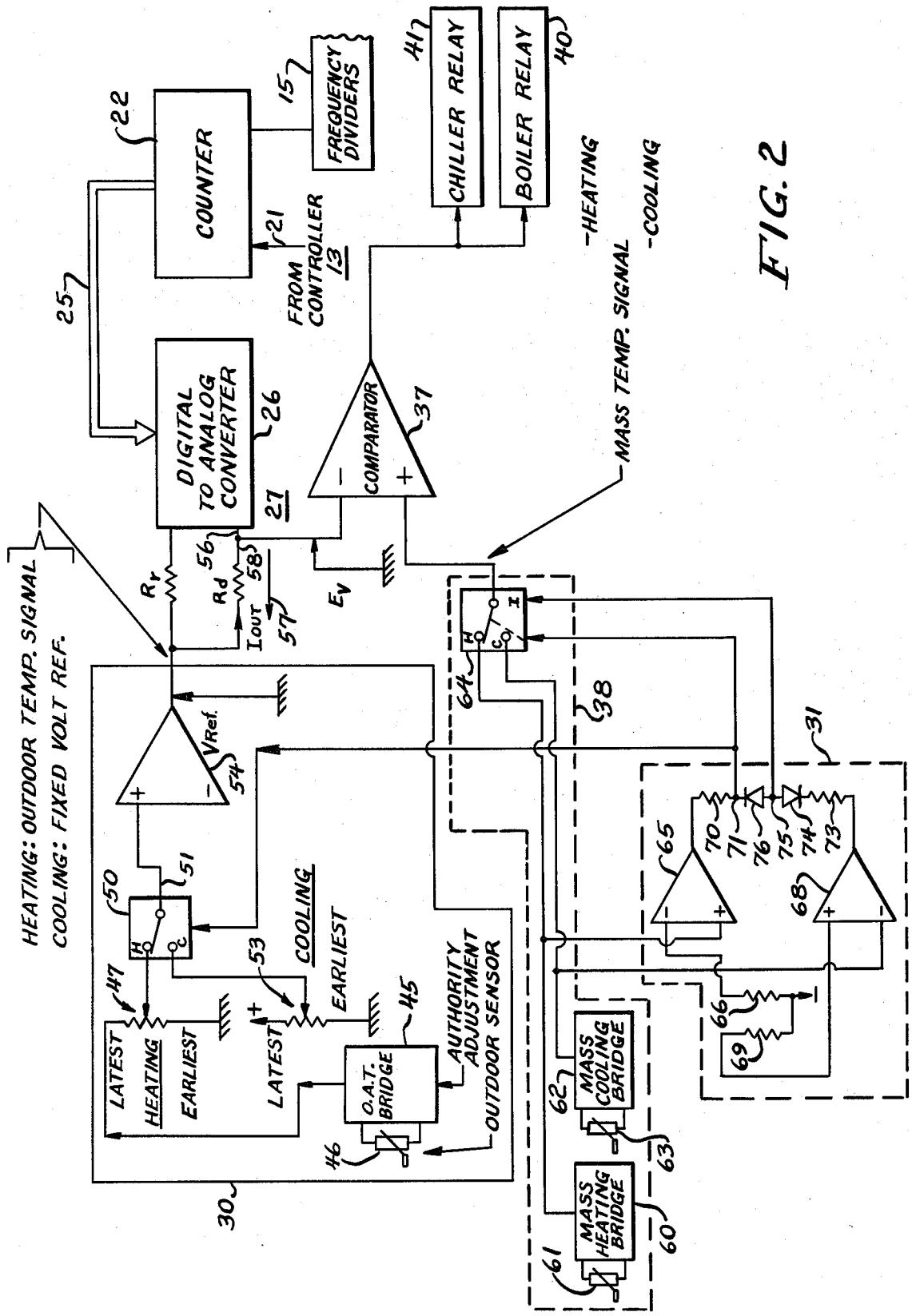
FIG. 2 is a more detailed diagram of the system of FIG. 1, some elements being shown in circuit schematic form.

Turning now to FIG. 2, some of the functional blocks identified in FIG. 1 are repeated, such as the divider circuit 15 (shown in fragmentary form in the right central portion of the drawing), the counter 22, digital to analog converter 26, and output comparator 37. In addition, the circuitry associated with the reference generator 30, mode selection circuit 31 and mass temperature signal generator 38 are shown in more detail.

Turning first to the reference signal generator 30, a bridge circuit 45, referred to as the outdoor air temperature bridge includes, in one branch, an outdoor temperature sensor 46. This temperature sensor, as well as the indoor temperature sensor to be described subsequently may have a nominal resistance of 1000 ohms at 70° F. and a positive temperature coefficient of approximately 3 ohms/° F. Such sensors are commercially available. As the sensed temperature increases, the resistance of the sensor 46 also increases, and it is connected in circuit in the bridge 45 such that as the outdoor temperature increases, the output signal of the bridge 45 also increases. The output signal from the bridge circuit 45 is connected to a terminal of a potentiometer generally designated 47, the other fixed terminal of which is grounded. The potentiometer 47 is set to determine earlier or later starting, as will be described. The signal from the movable arm of the potentiometer 47 is connected to an input terminal designated H of an analog switch 50. The output 51 of the analog switch 50 is connected to the H input terminal when the system is operating in a heating mode as determined by the Mode Selection Circuit 31. The cooling reference signal to the switch 50 is derived from a potentiometer 53, the power end of which is connected to a fixed reference voltage. The potentiometer 53 also determines earlier or later settings for operating in the cooling mode, as will be described. The output signal of the analog switch, taken on line 51 is connected to an amplifier 54, the output signal of which is the reference voltage to the digital to analog converter 26, being coupled to it through a reference resistor designated $R_r$. The output of the digital to analog converter 26 is taken at terminal 56 and connected to one terminal of a resistor $R_d$, the other terminal of which is connected to the reference voltage from amplifier 54. Terminal 56 is also connected to the negative input of the previously described comparator 37, the input impedance of the comparator 37 is very much greater than the impedance of the resistor $R_d$. Further, the value of the resistor $R_d$ is chosen to be equal to the value of the reference resistor $R_r$.

The digital to analog converter is an eight bit multiplying converter in which the output signal is a current signal. The output current is given by the following equation:

$$I_{Out} = V_{Reference}/R_{Reference} \times n/255 \qquad \text{Eq.(1)}$$

where
n = number of counts since beginning of search cycle
$V_{Reference}$ = Outdoor Air Temperature Signal (Heating Mode); Constant Voltage (Cooling Mode).

Assuming the output current of the digital to analog converter 26 is in the direction of the arrow 57, as it flows through the series dropping resistor $R_d$, it generates a voltage which is subtracted from the reference voltage generated by the amplifier 54. Further, because of the relatively low impedance of the dropping resistor, the signal is converted to a voltage to comprise the current to voltage converter 27. Thus, the resulting signal taken at junction 58 is the output of the summing junction 29—namely, the time varying set point voltage $E_V$; and it is fed to the negative input terminal of the comparator 37. In 255 equal steps, the output of counter 22 reduces $E_V$ to 0 volts as follows:

$$E_v = V_{Ref} - I_{Out} \times R_d \qquad \text{Eq. (2)}$$

and from Eq. (1), since $R_d = R_{Ref}$
$$E_v = V_{Ref}[1 - n/255] \qquad \text{Eq. (3)}$$

As soon as $E_V$ drops below the mass temperature signal from switch 65, the command signal to start heating or cooling is given.

The circuitry of the mass temperature signal generator 38 of FIG. 1 is enclosed within the dashed line 38 of FIG. 2; and it includes a mass heating bridge 60 in which a temperature sensor 61 is included, and a mass cooling bridge 62 which includes a second temperature sensor 63. As explained above, it is desirable to have two separate temperature sensors for the space being heated, one for heating and one for cooling. This permits the two sensors to be located more advantageously, depending upon the operating mode of the system. The output signal of the bridge 60 is fed to a terminal designated H of an analog switch 64, and the output of the bridge 62 is fed to an input designated C of the analog switch 64. The analog switch 64 also has a control input and an inhibit input designated I, both of which are received from the mode selection circuit 31, to be described presently. The output of the analog switch 64 is a signal from one of the mass temperature bridges 60, 62, depending upon the operating mode, and it is fed to the positive input of the comparator 37.

Turning now to the Mode Selection Circuit 31, it includes a first comparator 65 having its negative input connected to a negative reference voltage by means of a resistor 66, and its positive input connected to the output signal of the mass heating bridge 60. It also includes a second comparator 68 having its positive input connected to the negative reference signal by means of a resistor 69, and its negative input connected to the output signal of the mass cooling bridge 62. The output signal of comparator 65 is coupled via a resistor 70 to a signal output junction 71. The output signal of the comparator 68 is coupled via a resistor 73 and a diode 74 to an inhibit output junction 75. A diode 76 is connected between the junctions 71 and 75 in the polarity shown. The junction 71 is connected directly to the control inputs of the analog switches 50 and 64. The junction 75 is connected directly to inhibit input of the analog switch 64.

Figure 3:
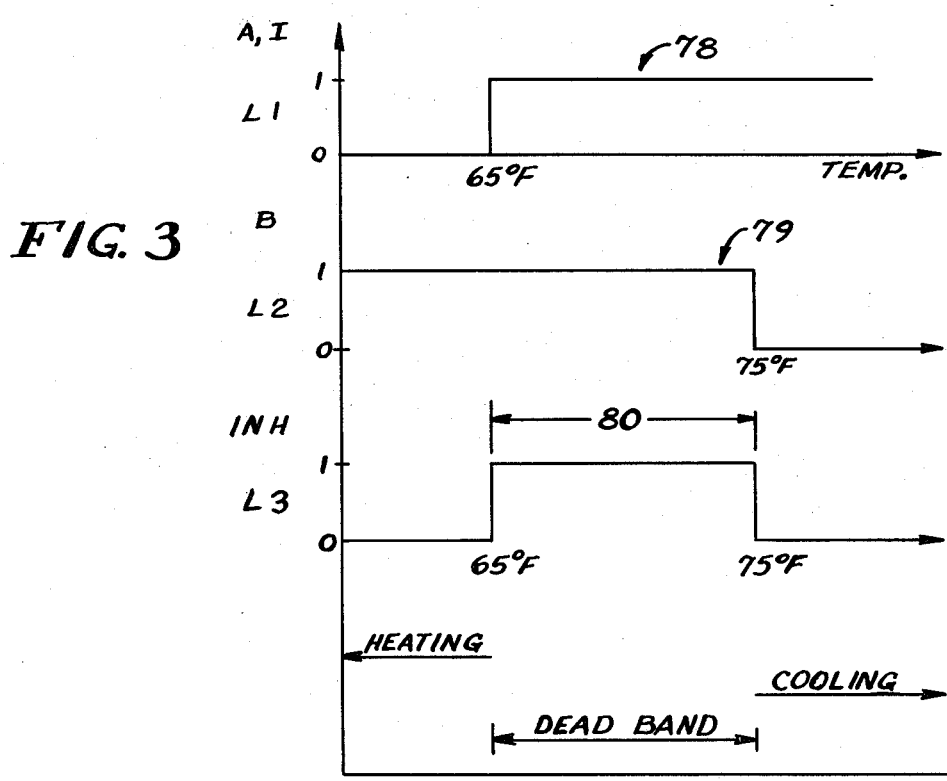
FIG. 3 is a graph illustrating the output signals of the mode selection circuitry of FIG. 3 under various conditions of mass temperature.
Figure 4:
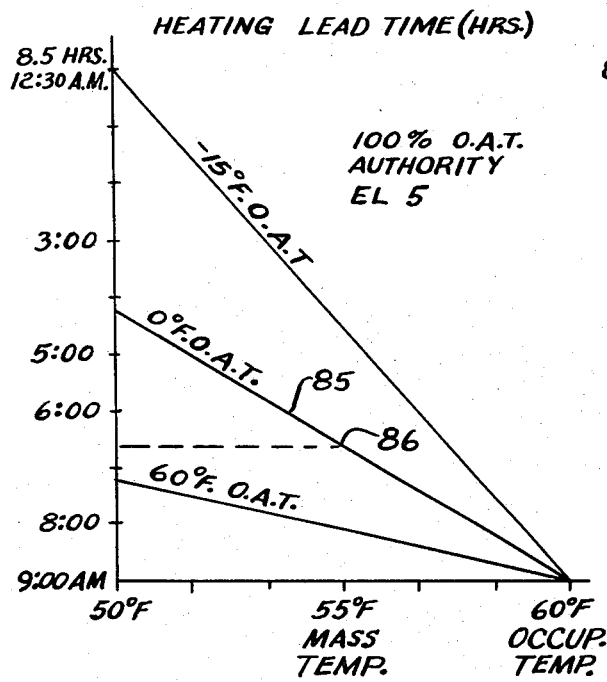
FIGS. 4–7 are graphs illustrating operation of the system in the heating mode under various operating conditions and settings.

Referring now to FIGS. 2 and 3, the sensors 61 and 63 are located within the space being heated, as already disclosed. When the signal from the mass heating bridge 60 is below a first predetermined temperature (65° F. in the illustrated embodiment), derived from the resistor 66, the output of the comparator 65 is a logic "0" and when the signal from the bridge 60 exceeds the reference, the comparator 65 switches to generate a logic "1", see curve 78 of line L1 of FIG. 3. When the output signal of the mass cooling bridge 62 is below a second predetermined temperature (preferably higher than the first predetermined temperature and 75° F. in the illustrated embodiment), the output signal of comparator 68 is a logic 1; and as the temperature rises above 75° F., the output signal of the comparator 68 becomes a 0, as illustrated by the curve 79 on line L2 of FIG. 3. The signal on line L1 of FIG. 4 is present at junction 71 of the Mode Control Circuit 31; and the signal on line L2 is present at the output of comparator 68. Thus, when the interior temperature is below 65° F., as sensed by sensor 61, the signal at junctions 71 and 75 is a logic 0 because the diode 74 is connected in a polarity to oppose the output signal of comparator 68. When the signal at junction 71 is a logic 0, and the signal at the input to the inhibit terminal of the analog switch 64 is a 0, the Mode Selection Circuit 31 defines an operating mode of heating. When the temperature rises above 65° F., but is below 75° F., as indicated by the bank 80 on line L3 of FIG. 3, both comparators 65 and 68 generate 1 output signals, so that the signal at junction 75 is a 1, and analog switch 64 is inhibited. This inhibits operation of the circuitry because comparator 37 has no input signal at its positive input terminal and is therefore inhibited. As the temperature rises above the higher predetermined value, 75° F., the output signal of comparator 68 becomes a 0 to force the signal level at junction 75 to 0, thereby enabling the analog gate 64. The signal at junction 71 remains a logic 1. This causes the system to operate in a cooling mode.

Still referring to FIG. 2, by adjusting the potentiometers 47, 53 to generate a greater signal (that is, towards the "later" position), the reference voltage $V_{Ref}$ generated by the circuit 30 is increased. This signal continues to be a function of the outdoor air temperature when the system is operating in the heating mode, but by increasing the reference signal, the time at which the set point signal $E_V$ falls below the mass temperature signal from the analog switch 64 is delayed. Thus, these potentiometers are used to independently adjust the start time of the boilers and chillers in the heating and cooling modes respectively, compare FIGS. 5 and 6 for the heating mode adjustment.

The outdoor air temperature bridge which includes the sensor 46 has a second adjustment which is referred to as the "outdoor authority" adjustment, and it has the effect of reducing the ability of the outdoor temperature sensor 46 to change the output signal from the bridge 45. That is, the error signal from the outdoor air temperature bridge becomes a constant signal, compare FIG. 4 with FIG. 7, for example.

OPERATION

Referring now to FIG. 4, the operation of the system will be described by way of example. Assuming that the search period is 8.5 hours, and the flip flop 14 is in circuit with the divider 15, and occupancy is scheduled for 9:00 A.M., if the outdoor air temperature is at 0° F., the time variable set point signal is generated according to the characteristic curve or line 85. Assuming that the outdoor air temperature authority is 100% and the earlier/later setting is 5 (an arbitrary number based on a scale of 0–10), if the mass heating temperature is 55° F., the time variable set point signal $E_V$ will fall below the mass heating temperature signal at approximately 6:30 A.M., as indicated at 86. For a lower outdoor air temperature, the start time will be earlier, and for a higher outdoor air temperature it will be later.

Figure 5:
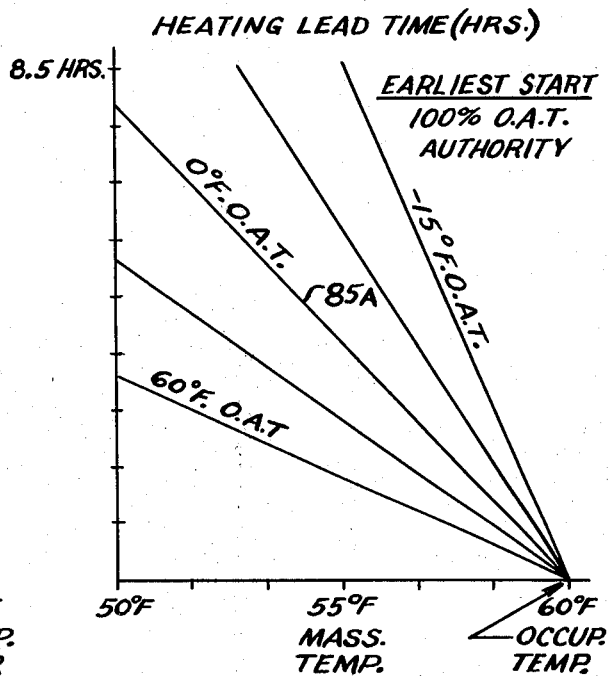

Referring now to FIG. 5, the effect on the characteristic operating curves of a setting of the earlier/later time is shown. By reducing the signal from the potentiometer 47, the start time is advanced, as can be seen by the position of the characteristic curve 85A, corresponding to the curve 85 discussed in connection with FIG. 4. Setting an earlier start time has the effect of rotating the characteristic curves clockwise.

Figure 6:
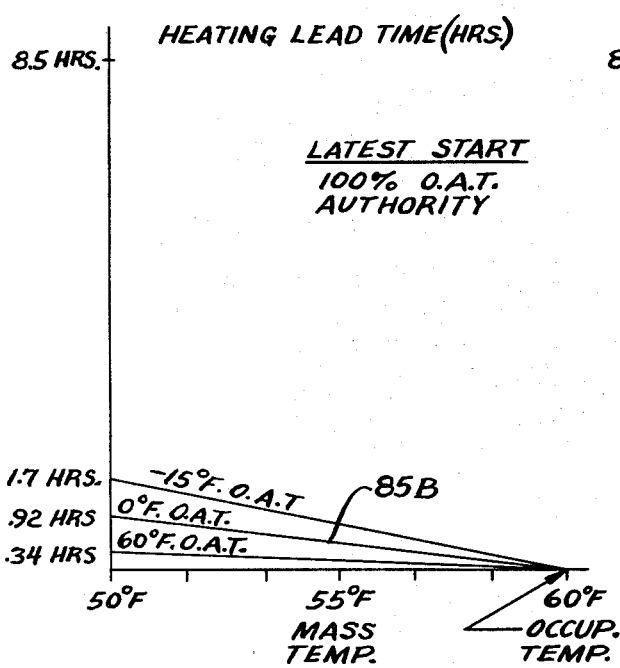

Correspondingly, by increasing the signal from the earlier/later potentiometers, the characteristic curves are rotated counterclockwise as illustrated in FIG. 6, to thereby delay start up time (see curve 85B).

Figure 7:
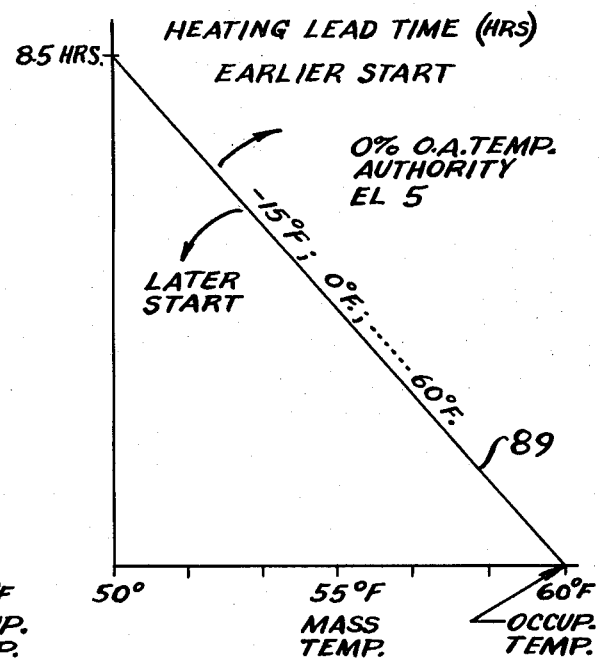

By reducing the outdoor air temperature authority, for the same earlier/later setting, the effect is to cause all of the characteristic curves to come closer to one another. In the limit condition, for a 0% outdoor air temperature authority, as illustrated in FIG. 7, a single characteristic curve is defined as at 89, for all outdoor air temperatures—that is, the characteristic is independent of outdoor air temperature. Again, for FIG. 7, it is assumed the system is operating in the heating mode.

Figure 8:
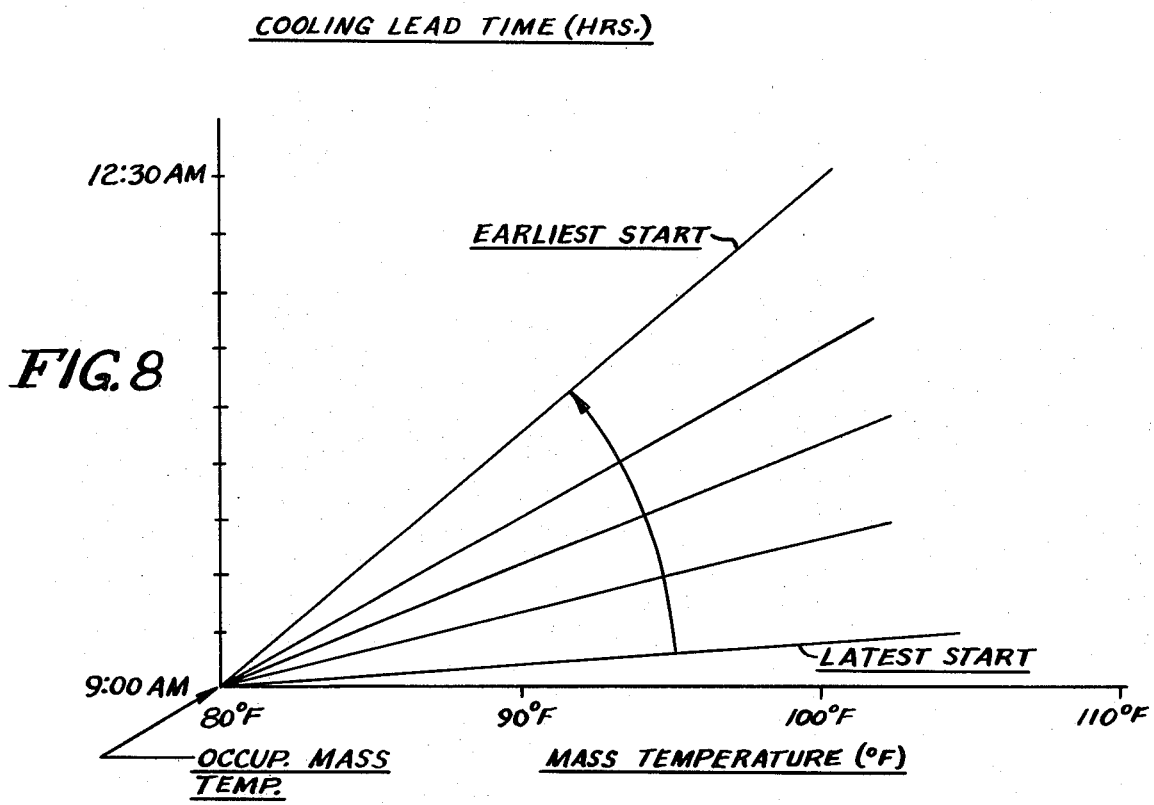
FIG. 8 is a graph illustrating operation of the system in the cooling mode for various settings of early/late start time.

Referring now to FIG. 8, when the system is operating in the cooling mode, there is no reliance on the outdoor air temperature; however, the potentiometer 53 does permit an adjustment of the start time of the search period. By increasing the signal from the potentiometer 53, the operating characteristic is rotated clockwise in FIG. 8 to yield a later start time for a given mass cooling temperature (represented on the abscissa of the graph of FIG. 8).

It will thus be appreciated that the present invention provides a solid state circuit for generating a time variable set point signal for an optimal start programmer of the type used in heating and air conditioning of a large, intermittently occupied building. The circuit also provides for automatic selection of the mode of operation as a function of the indoor temperature, and accounts for differences in outdoor temperature when operating in the heating mode. Adjustments are permitted for weighting the effect of the outdoor air temperature in the heating mode, as well as for delaying or advancing the start time of the equipment.

Having thus disclosed in detail a preferred embodiment of the invention, persons skilled in the art will be able to modify certain of the structure which has been illustrated and to substitute equivalent elements for those disclosed while continuing the practice the principle of the invention; and it, therefore, intended that all such modifications and substitutions be covered as they are embraced within the spirit and scope of the appended claims.

I claim:

1. An optimal start programmer apparatus operable in a heating mode to generate an output command signal for actuating heating means, and operable in a cooling mode to generate an output command signal for actuating cooling means, said apparatus generating said output command signal during a predetermined search period prior to occupancy of the building, said apparatus comprising: mode selection circuit means responsive to an indoor mass temperature for the building for selecting an indoor mass temperature for the building for selecting the operating mode for the apparatus; timing source means for generating a periodic timing signal of known repetition rate; counter circuit means coupled to said timing source means enabled at the start of a search period to be responsive to said timing signal for generating digital signals representative of lapsed time from the commencement of the search period; converter circuit means coupled to said counter circuit means and responsive to said digital signals for generating an enabling signal representative of said digital signals; reference signal generating means controlled by said mode selection circuit means to provide a reference signal which varies as a function of outside air temperature when the apparatus is operating in the heating mode and to provide a reference signal which is independent of outside air temperature when the apparatus is operating in the cooling mode; means for receiving and summing the reference signal provided by said reference signal generating means and said analog signal to thereby generate a time variable set point signal which is representative of the outside air temperature when the apparatus is operating in the heating mode and which is independent of the outside air temperature when the apparatus is operating in the cooling mode and means for comparing said time variable setpoint signal with an indoor mass temperature signal and responsively generating said output command signal when the mass temperature signal and the time variable set point signal reach a predetermined relation.

2. The apparatus of claim 1 further comprising controller means for generating an enable signal at the commencement of a search period to enable said counter circuit means to be responsive to said timing signal.

3. The apparatus of claim 2 wherein said controller means is responsive to said periodic timing signal for generating time-of-day data in response thereto and for generating said enable signal a predetermined time before scheduled occupancy of said building to define said search period, said counter circuit means being responsive to said enable signal to accumulate said timing signals during said search period.

4. Apparatus for generating a time variable set point signal for use in actuating heating or cooling means during a preoccupation search period for a building comprising: timing source means for generating a periodic timing signal of known repetition rate; counter circuit means responsive to said timing signal for generating digital signals representative of lapsed time; and converter circuit means responsive to said digital signal for generating an analog signal representative of said digital signals and defining the slope of said set point signal; mode selection circuit means sensing indoor mass temperature for generating a heating mode signal when the sensed indoor temperature is below a first predetermined temperature and for generating a cooling mode signal when the sensed indoor mass temperature is above a second predetermined temperature; reference signal generator means responsive to the output signal of said mode selection circuit means and including sensor means sensing outdoor air temperature for generating a reference voltage signal in the heating mode which is a function of outdoor air temperature, said voltage reference signal being coupled as a reference voltage to said converter circuit means, whereby the output signal of said converter circuit means depends upon the outdoor air temperature in the heating mode.

5. The apparatus of claim 4 further comprising summation circuit means receiving said reference voltage signal and subtracting the output signal of said converter circuit means therefrom to generate said time variable set point signal.

6. The apparatus of claim 5 wherein said reference signal generator means is further responsive to said cooling mode signal for generating a different reference voltage in said cooling mode.

7. The apparatus of claim 6 wherein said reference signal generator means generates a constant reference signal in response to said cooling mode signal.

8. The apparatus of claim 6 further comprising comparator circuit means responsive to said set point signal and a signal representative of indoor mass temperature for generating an output command signal calling for actuation of a heat source in the heating mode or a chiller source in the cooling mode when the mass temperature signal exceeds the time variable set point signal.

9. The apparatus of claim 5 wherein said first predetermined temperature is lower than said second predetermined temperature, said mode selection circuit generating an inhibit signal to inhibit said apparatus from generating an output command signal when said mass temperature signal is between said first and second predetermined temperatures.

10. Apparatus for operating in a heating mode to generate an output command signal to actuate a source of heat, and for operating in a cooling mode to generate an output command signal to actuate an air conditioning source, said apparatus generating said output command signal during a predetermined search period prior to occupancy of the building, comprising: means for generating a periodic timing signal; controller circuit means responsive to said timing signal for generating time-of-day data and for generating an enable signal a predetermined time before the scheduled occupancy time of said building; digital counter circuit means enabled by said enable signal of said controller circuit means and responsive to the timing signal for generating digital signals representative of time lapsed since the commencement of said search period; converter circuit means responsive to said lapsed time digital signals for generating an analog signal representative thereof; circuit means responsive to said analog signal for generating a time variable set point signal; mass temperature signal generator means for generating a signal representative of the mass temperature of the interior of said building; and comparison circuit means for comparing said set point signal and said mass temperature signal for generating said output command signal when said mass temperature signal and said time variable set point signal reach a predetermined relation.

11. The apparatus of claim 10 further comprising mode selection circuit means responsive to said mass temperature signal for generating a heating mode control signal if the sensed mass temperature is less than a first predetermined temperature value and for generating a cooling mode control signal if said sensed mass temperature is greater than a second predetermined temperature value, said apparatus being responsive to said mode control signals to operate respectively in heating and cooling modes.

12. The apparatus of claim 11 wherein said circuit means for generating said set point signal further comprises reference signal generator means including an external temperature sensor for generating a signal representative of outdoor air temperature; switching means responsive to said heating mode control signal for coupling said external temperature signal as a reference to said converter circuit means when said system is operating in the heating mode, whereby said set point signal is a function of the outdoor temperature.

13. The apparatus of claim 12 wherein said reference signal generator means further includes means for generating a cooling reference signal, said switching means being responsive to said cooling mode control signal for coupling said cooling reference signal as said reference signal of said converter circuit means during operation in said cooling mode.

14. The apparatus of claim 13 further comprising first settable circuit means in circuit with said external temperature sensor means for weighting said heating reference signal before coupling the same to said converter circuit means to thereby provide adjustment of equipment start time.

15. The apparatus of claim 14 further comprising second settable circuit means in circuit with said means for generating a cooling reference signal for weighting said cooling reference signal to provide adjustment of equipment start time.

16. The apparatus of claim 12 further comprising summing junction means receiving said reference signal and the output of said converter circuit means for subtracting the latter from said reference signal whereby said time varying set point signal has a relatively large initial value and decreases with time.

17. The apparatus of claim 11 wherein said mass temperature signal generator means comprises first and second temperature sensing means each sensing indoor temperature for generating a signal representative thereof; comparison circuit means for comparing said set point signal with said mass temperature signal; and second switching circuit means responsive to the output of said mode selection circuit means for coupling said first and second temperature sensing means respectively to said comparison circuit means in the heating and cooling modes respectively.

18. The apparatus of claim 11 wherein said second temperature value is higher than said first temperature value, the separation between said temperature values defining a dead band, said mode selection circuit generating an inhibit signal when the sensed temperature is in said dead band, said inhibit signal inhibiting the transmission of a command signal to said heat and cooling sources when the sensed internal temperature is within said dead band.

* * * * *